US011551026B2

(12) United States Patent
Kim et al.

(10) Patent No.: US 11,551,026 B2
(45) Date of Patent: Jan. 10, 2023

(54) DYNAMIC RECONFIGURATION TRAINING COMPUTER ARCHITECTURE

(71) Applicant: Raytheon Company, Waltham, MA (US)

(72) Inventors: Peter Kim, Irvine, CA (US); Justin A. Fishbone, Reston, VA (US)

(73) Assignee: Raytheon Company, Waltham, MA (US)

( * ) Notice: Subject to any disclaimer, the term of this patent is extended or adjusted under 35 U.S.C. 154(b) by 651 days.

(21) Appl. No.: 16/584,290

(22) Filed: Sep. 26, 2019

(65) Prior Publication Data

US 2020/0167593 A1 May 28, 2020

Related U.S. Application Data

(60) Provisional application No. 62/771,796, filed on Nov. 27, 2018.

(51) Int. Cl.
*G06K 9/62* (2022.01)
*G06F 16/28* (2019.01)
*G06F 16/22* (2019.01)
*G06N 20/00* (2019.01)
*G06F 9/445* (2018.01)
*G06N 3/08* (2006.01)

(52) U.S. Cl.
CPC ......... *G06K 9/623* (2013.01); *G06F 9/44505* (2013.01); *G06F 16/2246* (2019.01); *G06F 16/285* (2019.01); *G06N 3/08* (2013.01); *G06N 20/00* (2019.01)

(58) Field of Classification Search
CPC ..... G06F 9/44505; G06F 9/445; G06N 20/00; G06N 20/10; G06N 20/20; G06N 3/08; G06K 9/623
See application file for complete search history.

(56) References Cited

U.S. PATENT DOCUMENTS

2019/0228343 A1\* 7/2019 Gu .................... G06N 20/20

FOREIGN PATENT DOCUMENTS

WO WO-2020112228 A1 6/2020

OTHER PUBLICATIONS

"International Application Serial No. PCT US2019 053219, International Search Report dated Dec. 20, 2019", 4 pgs.
"International Application Serial No. PCT US2019 053219, Written Opinion dated Dec. 20, 2019", 5 pgs.
(Continued)

*Primary Examiner* — Hau H Hoang
(74) *Attorney, Agent, or Firm* — Schwegman Lundberg & Woessner, P.A.

(57) ABSTRACT

A dynamic reconfiguration training machine learning computer architecture is disclosed. According to some aspects, a computing machine accesses a configuration file. The configuration file specifies parameters for a machine learning session. The computing machine trains a machine learning module to solve a problem, where the machine learning module operates according to the parameters specified in the configuration file. The computing machine generates an output representing the trained machine learning module.

18 Claims, 11 Drawing Sheets

(56) References Cited

OTHER PUBLICATIONS

Doetsch, P, "RETURNN: the RWTH extensible training framework for universal recurrent neural networks", Proceedings of the 2017 IEEE International Conference on Acoustics, Speech and Signal Processing (ICASSP'17), (Mar. 5, 2017), 5 pgs.

Garg, U, "Fabrik: an online collaborative neural network editor", arxiv.org, Cornell University Library, 201OLIN Library Cornell University Ithaca, NY 14853, (Oct. 27, 2018), 12 pgs.

Kamath, P, "AMLA: an AutoML frAmework for neural network design", Automatic Machine Learning Workshop at ICML'18, [Online] Retrieved from the internet:https: sites.google.com site automl2018 icml accepted-papers 55.pdf, (Jul. 14, 2018), 6 pgs.

Kornuta, T, "Accelerating machine learning research with MI-Prometheus", OpenReview.net: rev. Oct. 29, 2018, [Online] Retrieved from the internet:https: openrevi ew.net pdf? i d=rJgZOtpN2X, (Oct. 29, 2018), 5 pgs.

Neubig, G, "XNMT: the extensible Neural Machine Translation toolkit", arxiv.org, Cornell University Library, 201 Olin Library Cornell University Ithaca, NY 14853, (Mar. 1, 2018), 9 pgs.

Szalkai, B, "SECLAF: a webserver and deep neural network design tool for biological sequence classification", arXiv:1708.04103vl, [Online] Retrieved from the internet:https: arxiv.org abs 1708.04103vl, (Aug. 14, 2017), 4 pgs.

"Configuration-Sacred.8.2", [Online], Retrieved from the Internet: <URL: https://sacred.readthedocs.io/en/latest/configuration.html>, (2015), 9 pgs.

"Keras FAQ", [Online], Retrieved from the Internet: <URL: https://keras.io/getting_started/faq/#how-can-i-save-a-keras-model>, (Accessed May 20, 2021), 15 pgs.

"Module: tf.compat.v1.logging TensorFlow Core v2.5", [Online], Retrieved from the Internet: <URL: https://www.tensorflow.org/api_docs/python/tf/compat/v1/logging>, (2020), 2 pgs.

"International Application Serial No. PCT/US2019/053219, International Preliminary Report on Patentability dated Jun. 10, 2021", 7 pgs.

\* cited by examiner

DYNAMIC RECONFIGURATION TRAINING COMPUTER ARCHITECTURE

PRIORITY CLAIM

This application claims priority under 35 U.S.C. § 119 to U.S. Provisional Patent Application Ser. No. 62/771,796, filed Nov. 27, 2018, and titled, "DYNAMIC RECONFIGURATION TRAINING COMPUTER ARCHITECTURE," which is incorporated herein by reference in its entirety.

TECHNICAL FIELD

Embodiments pertain to computer architecture. Some embodiments relate to a computer architecture for machine learning. Some embodiments relate to a dynamic reconfiguration training computer architecture for machine learning.

BACKGROUND

Machine learning is useful for many purposes, such as optical character recognition, image recognition, network intruder detection, spam filtering, and the like. However, configuring a machine learning architecture for a given task may be cumbersome and may require modification to code or hardware. As the foregoing illustrates, a dynamic reconfiguration training computer architecture for machine learning may be desirable.

SUMMARY

Figure 1:
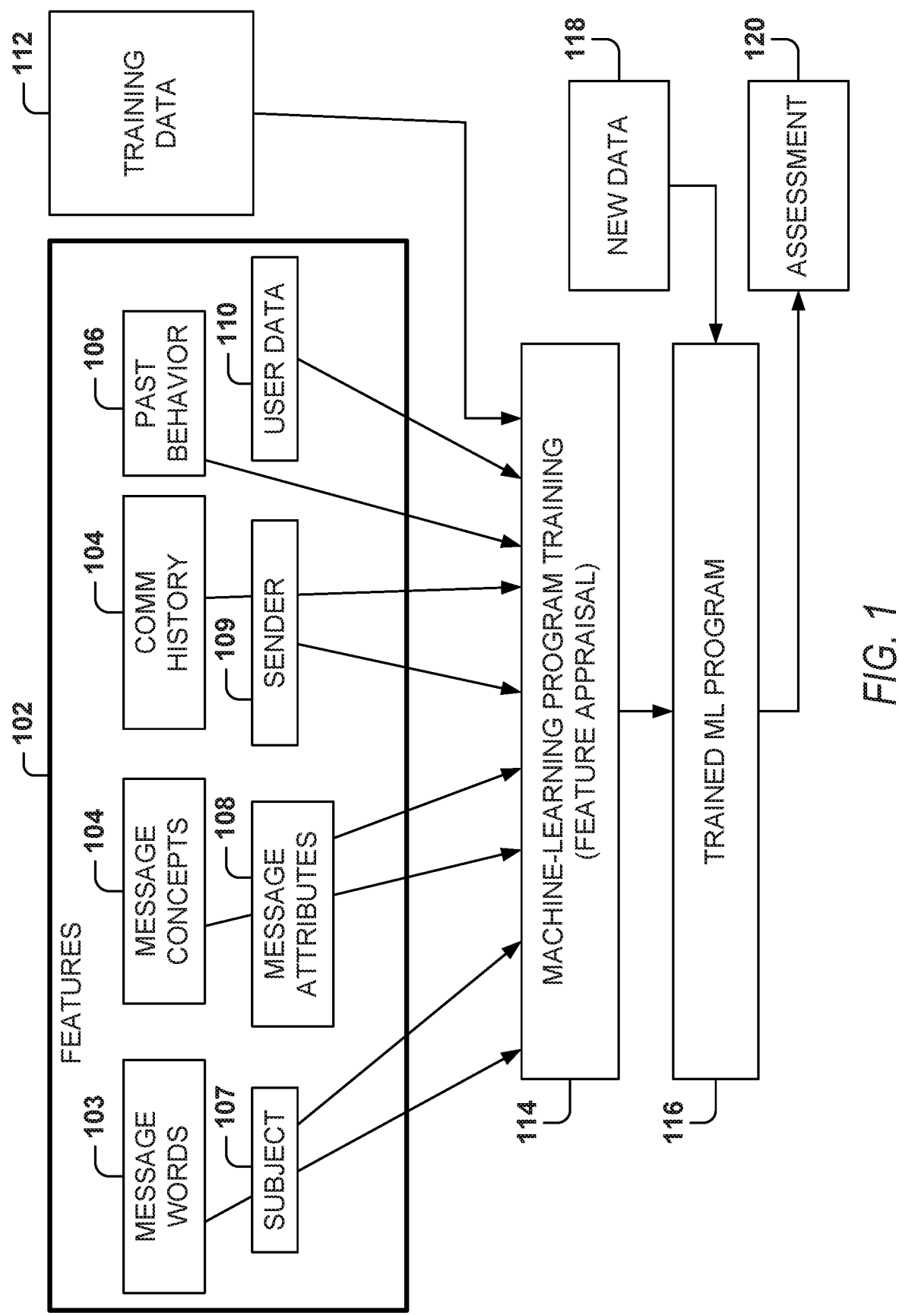
FIG. 1 illustrates the training and use of a machine-learning program, in accordance with some embodiments.

The present disclosure generally relates to machines configured to provide neural networks, including computerized variants of such special-purpose machines and improvements to such variants, and to the technologies by which such special-purpose machines become improved compared to other special-purpose machines that provide technology for neural networks. In particular, the present disclosure addresses systems and methods for multiplier-less neural networks.

According to some aspects of the technology described herein, a machine learning apparatus include processing circuitry and memory. The processing circuitry accesses a configuration file. The configuration file specifies parameters for a machine learning session. The processing circuitry trains a machine learning module to solve a problem, where the machine learning module operates according to the parameters specified in the configuration file. The processing circuitry generates an output representing the trained machine learning module.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, machine learning is useful for many purposes, such as optical character recognition, image recognition, network intruder detection, spam filtering, and the like. However, configuring a machine learning architecture for a given task may be cumbersome and may require modification to code or hardware. As the foregoing illustrates, a dynamic reconfiguration training computer architecture for machine learning may be desirable.

Some aspects of the technology described herein are directed to a dynamic reconfiguration training computer architecture for machine learning. According to some implementations, a computing machine accesses a configuration file. The configuration file specifies parameters for a machine learning session. The computing machine trains a machine learning module to solve a problem, where the machine learning module operates according to the parameters specified in the configuration file. The computing machine generates an output representing the trained machine learning module.

When running algorithms with deep learning neural networks, and making changes to (e.g. tweaking) the algorithms, it becomes difficult to keep track of the many different configurations that were changed from one algorithm to another. Many times, the neural network architecture changes are hardcoded and it becomes difficult to keep track of which architectures correspond to which results. Furthermore, the training data that was used, how the data was processed, as well as the number of iterations in which the network was trained, are easily lost without some organized architecture. This problem becomes evident when past results cannot be duplicated due to lost parameters and configuration settings.

In some implementations, the Dynamic Reconfigurable Training Architecture (DRTA) is an architecture for training a deep learning neural network. DRTA provides the capability to adjust the parameters and keep a log of those adjustments. The architecture may implemented in a JSON (JavaScript Object Notation) file format which can be ingested easily into Python. Alternatively, other file format(s) may be used. The architecture includes a configuration file that identifies key elements of training a convolutional neural network.

In some aspects, the configuration file has a schema is a tree structure that includes five children nodes under the root. (See FIGS. 8-13.) The children nodes include: (1) staging (prepares the files to minimize the I/O (input/output) latency during training), (2) data_ingest (configures how the staged data will be 'fed' during training), (3) NN_arch (neural network architecture) (4) Driver (configures the main training loop) and (5) Reporting (configures which plots will be generated for analysis). At the "staging" configuration, the configuration file may specify how the training data will be generated and placed in the file system. At the "data ingest" configuration, the configuration file specifies where the staged data is located in the file system as well as how the files will be read during the training time. In some aspects, the configuration file also specifies the runtime preprocessing operations to perform as well as how the data will be split into the train/test/validation bins. At the "NN_arch" configuration, the configuration file may specify the architecture of the neural network. For example, the configuration file may specify the number of convolution layers, the size of the kernels, the number of hidden layers, the number of nodes at each hidden layer, and the like. This is useful in regenerating the neural network architecture after the training, and to duplicate any results. At the "driver" configuration, the configuration file may specify how many iterations to train the deep learning neural network. At the "reporting" configuration, the configuration file specifies which reports and visual plots to generate for future analysis.

As used herein the term "file" encompasses its plain and ordinary meaning. In addition, a file may include one or more files. Furthermore, a file may include any organization of data, not necessarily limited to a "file" as defined in the Windows® or Macintosh® operating systems.

Some aspects of the technology describe herein include that all of the parameters that may be configured in a neural network architecture may be laid out in an organized manner. The DRTA allows a programmer to configure and experiment with the neural network parameters while keeping track of those settings and results. Due to the tree structure of the configuration file, the configuration file is easily extensible with additional features and capabilities. It is also queue-able in that programmer(s) can create configurations and place them in a queue for processing.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
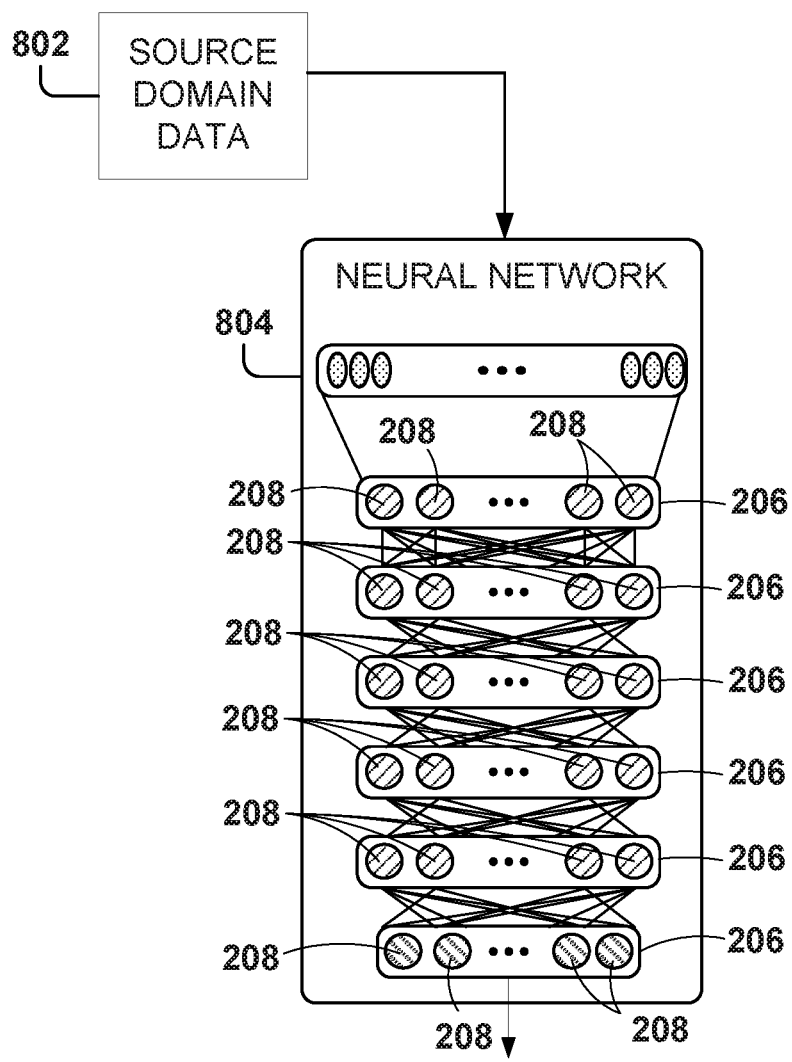
FIG. 2 illustrates an example neural network, in accordance with some embodiments.
Figure 2:
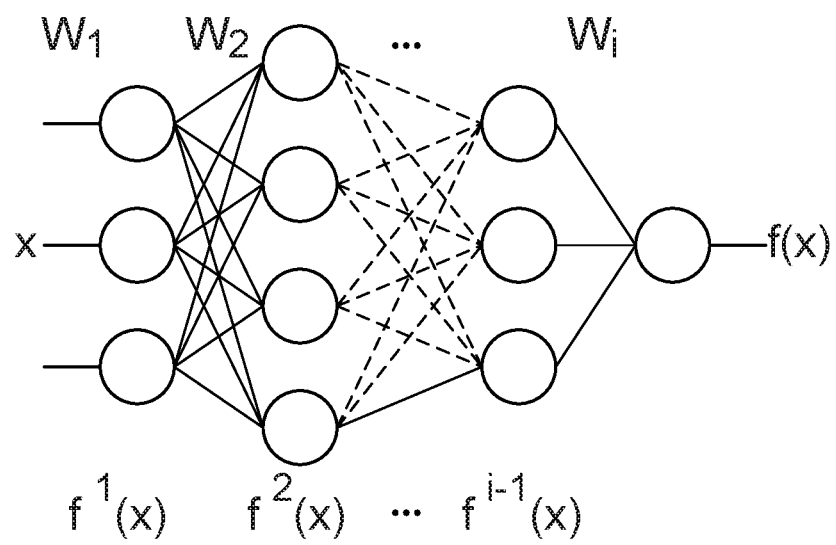

FIG. 2 illustrates an example neural network 204, in accordance with some embodiments. As shown, the neural network 204 receives, as input, source domain data 202. The input is passed through a plurality of layers 206 to arrive at an output. Each layer includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1$, $W_2$, . . . , $W_i$ are applied to the input to each layer to arrive at $f^1(x)$, $f^2(x)$, . . . , $f^{i-1}(x)$, until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
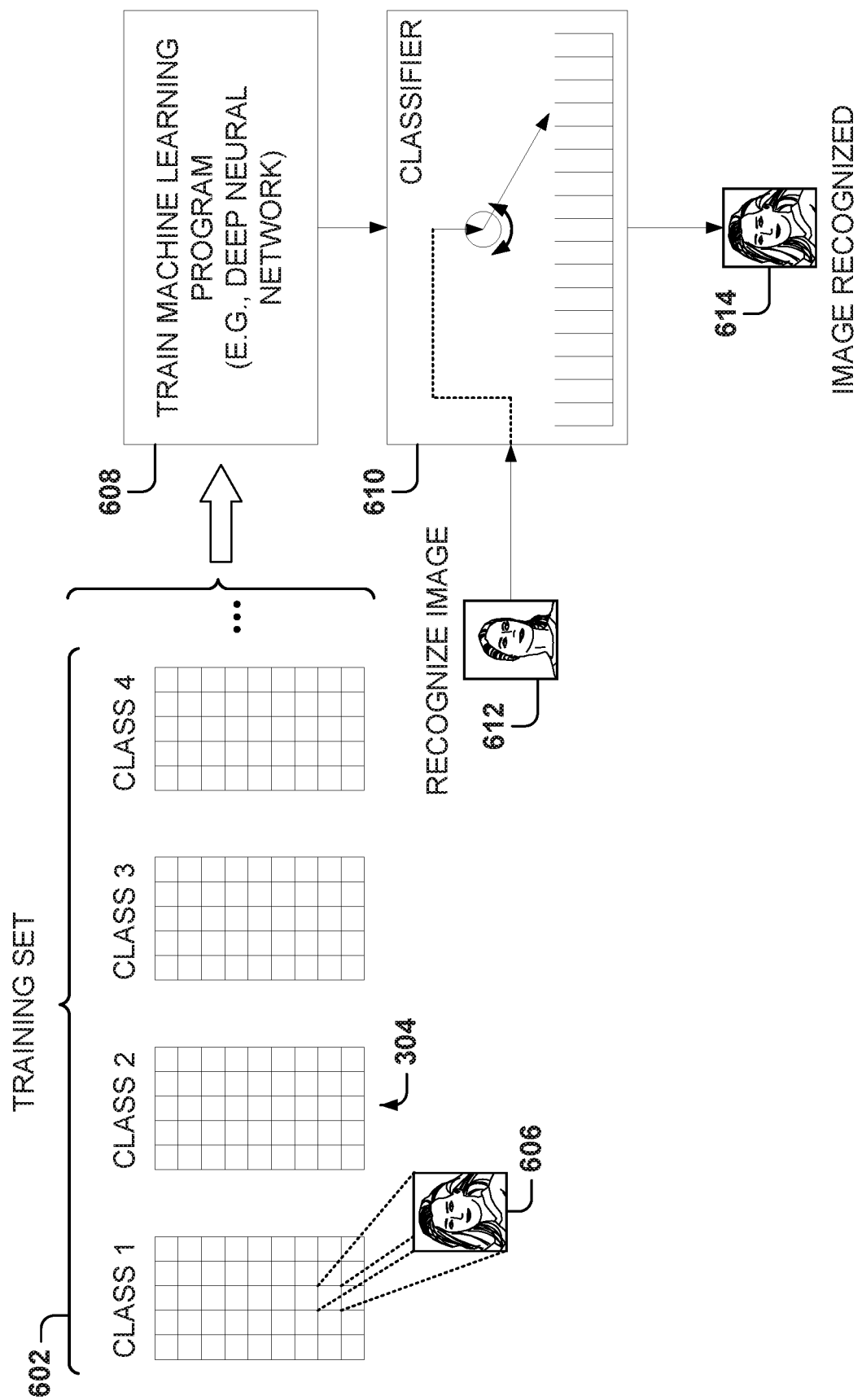
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
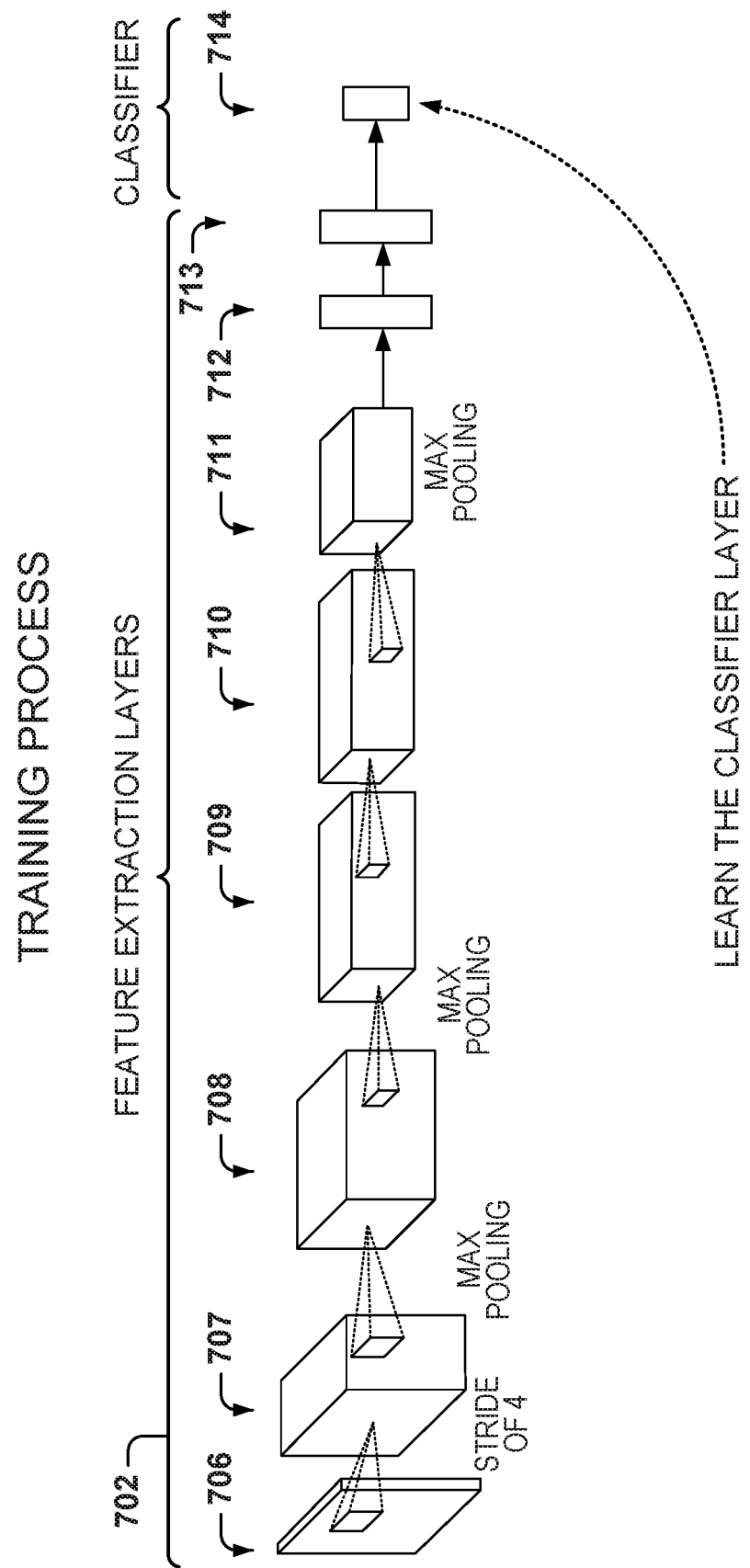
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
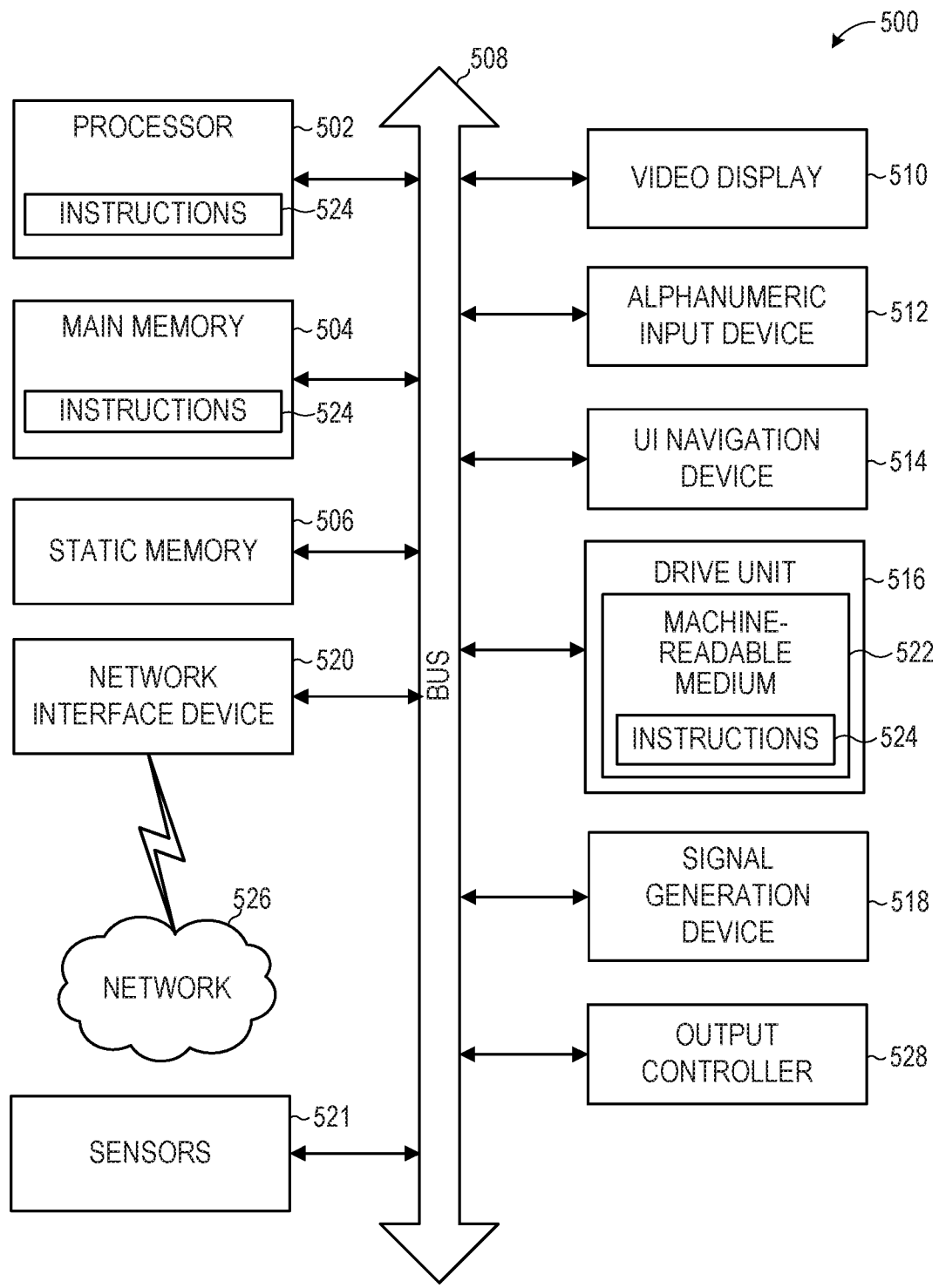
FIG. 5 is a block diagram of a computing machine, in accordance with some embodiments.

FIG. 5 illustrates a block diagram of a computing machine 500 in accordance with some embodiments. In some embodiments, the computing machine 500 may store the components shown in the circuit block diagram of FIG. 5. For example, the circuitry 500 may reside in the processor 502 and may be referred to as "processing circuitry." In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Figure 6:
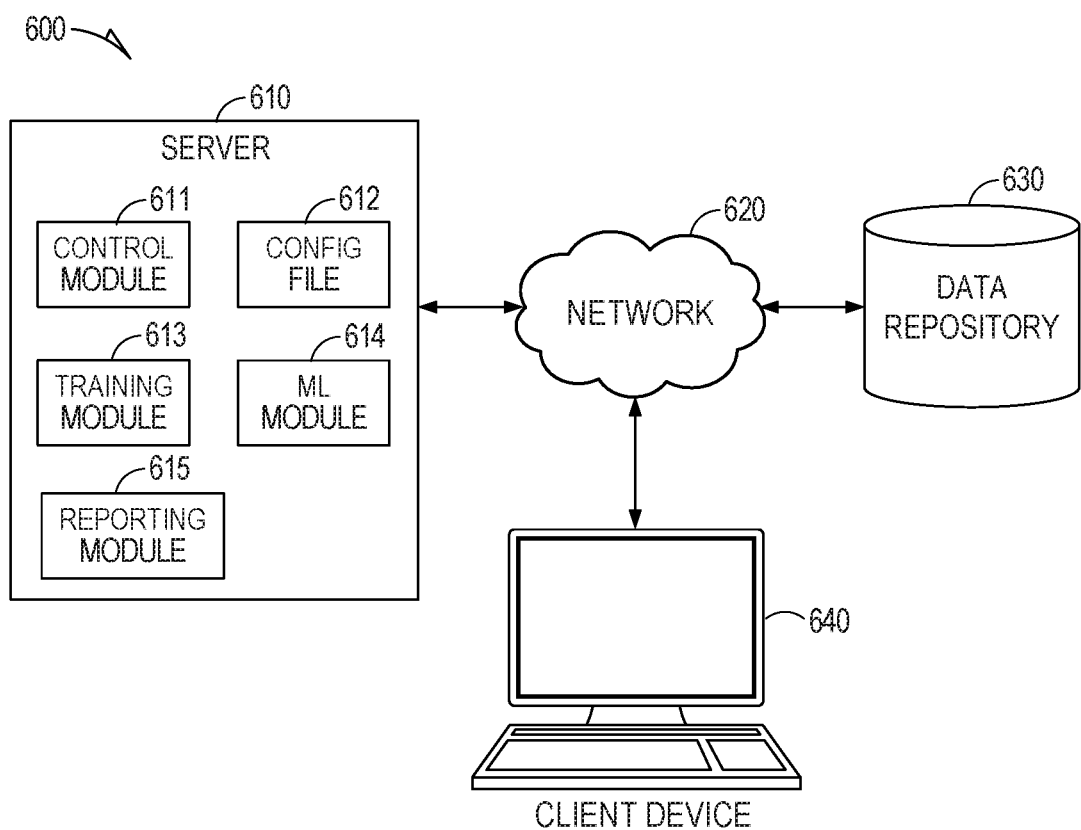
FIG. 6 illustrates an example system in which a dynamic reconfiguration training computer architecture may be implemented, in accordance with some embodiments.

FIG. 6 illustrates an example system 600 in which a dynamic reconfiguration training computer architecture may be implemented, in accordance with some embodiments. As shown, the system 600 includes a server 610, a data repository 630, and a client device 640 connected to one another via a network 620. The network 620 may include one or more of the Internet, an intranet, a local area network, a wide area network, LTE, UMTS, WiMax®, and the like.

The client device 640 may be any end-user computing device, such as a laptop computer, a desktop computer, a mobile phone, a tablet computer, an electronic book reader, a digital music player, a smart watch, a smart television, and the like. The data repository 630 may be any data storage unit, such as a database. According to some implementations, the data repository 630 stores training, testing, and/or validation data for machine learning implemented at the server 610.

As shown, the server 610 includes a control module 611, a configuration (config) file 612, a training module 613, a machine learning (ML) module 614, and a reporting module 615. The training module 613 trains the machine learning module 614 to solve a problem (e.g. image recognition, voice recognition, email spam detection, network intruder detection, driving a motor vehicle, and the like). The configuration file 612 stores configuration information for the machine learning module 614 and the training module 613.

The control module 611, when executed, causes the server 610 to accesses the configuration file 612. For example, the server 610 may obtain the configuration file 612 via the network 620 from the client device 640. The configuration file 612 specifies parameters for a machine learning session. The server 610, during execution of the control module 611, trains, using the training module 613, the machine learning module 614 to solve a problem. The machine learning module 614 operates according to the parameters specified in the configuration file 612. The server 610, during execution of the control module 611, generates an output representing the trained machine learning module. For example, the server 610 may output, to the client device 640 via the network 620, an indication that the machine learning module 614 has been trained and is available for use.

Figure 7:
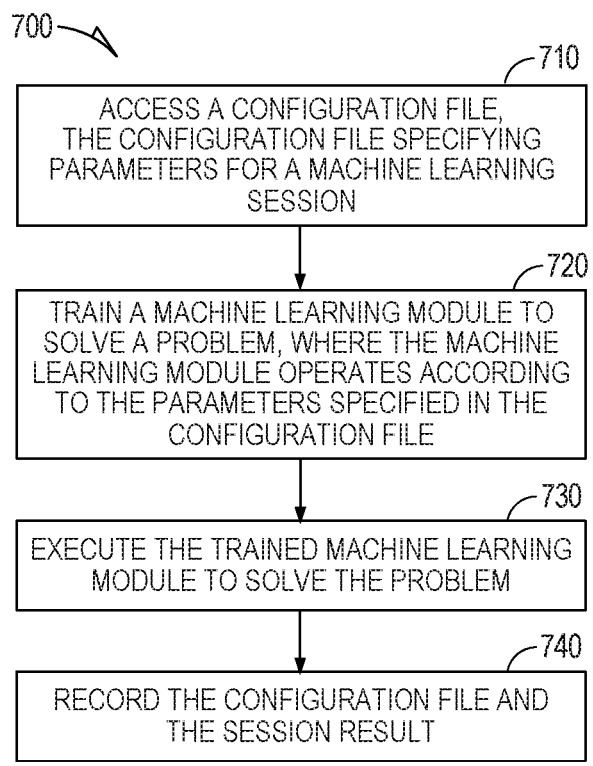
FIG. 7 is a flow chart of a method for dynamic reconfiguration training, in accordance with some embodiments.

Details of example operations of the server 610, when executing the control module 611, are described in conjunction with FIG. 7. Details of example structures of the configuration file 612 are described in conjunction with FIGS. 8-13.

When the control module 611 executes, it logs the results into a logging directory (which may be stored, for example, at the server 610 or at the data repository 630). The client device 640 may access the logging directory to review past training sessions. A copy of the configuration file 612 used for each training session may be stored in the logging directory.

FIG. 6 illustrates some aspects of the technology described herein being implemented in a client-server network setting with three computing machines—the server 610, the data repository 630, and the client device 640. However, in alternative embodiments, the technology may be implemented in a single machine, rather than across multiple machines. In some embodiments, the technology may be implemented using multiple machines that are connected using technology other than a network (e.g., a direct wired or wireless connection). In some embodiments, a single machine encompasses two or more of the server 610, the data repository 630, or the client device 640. In some embodiments, the functions of the server 610 (or the client device 640 or the data repository 630) are implemented by two or more machines.

FIG. 7 is a flow chart of a method 700 for dynamic reconfiguration training, in accordance with some embodiments. The method 700 may be implemented by the server 610 when executing the control module 611. Alternatively, other computing machine(s) may be used to implement the method 700.

At operation 710, the server 610 accesses the configuration file 612. The configuration file 612 specifies parameters for a machine learning session. The configuration file 612 may be received, at the server 610, from the client device 640 and may be created by a user of the client device 640.

Figure 8:
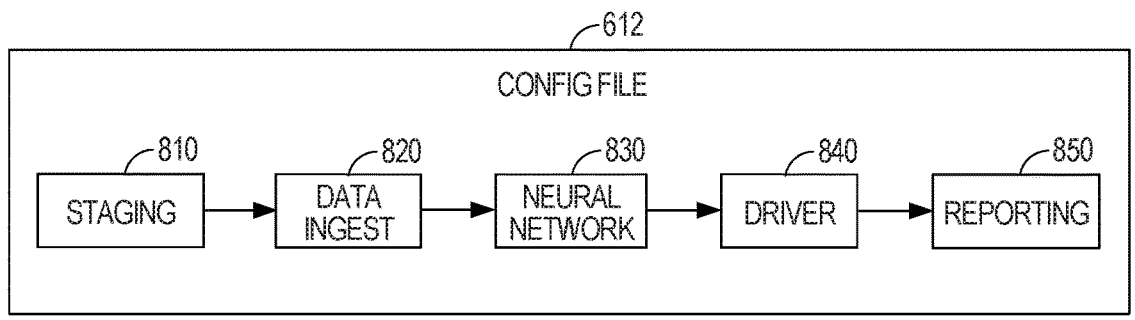
FIG. 8 is a block diagram of a configuration file, in accordance with some embodiments.

FIG. 8 is a block diagram of the configuration file 612, in accordance with some embodiments. In some examples, the configuration file is a JSON file having a tree structure. The tree structure includes branches that separate the parameters into categories. The categories may include one or more of: staging parameters 810, data ingest parameters 820, neural network parameters 830, driver parameters 840, and reporting parameters 850. In some examples, a parent nodes links to five children nodes 810-850. The children nodes 810-850 may link to further children nodes, as shown in FIGS. 9-13.

In some aspects, the configuration file 612 has a schema is a tree structure that includes five (or another number of) children nodes 810-850 under the root. The children nodes may correspond to the categories described above. The staging children nodes prepare the files to minimize the I/O latency during training. The data ingest children nodes configure how the staged data will be 'fed' during training. The neural network children nodes define the neural network architecture. The driver children nodes configure the main training loop. The reporting children nodes configure which plots will be generated for analysis.

At the "staging" configuration 810, the configuration file 612 may specify how the training data will be generated and placed in the file system. At the "data ingest" configuration 820, the configuration file 612 specifies where the staged data is located in the file system as well as how the files will be read during the training time. In some aspects, the configuration file 612 also specifies the runtime preprocessing operations to perform as well as how the data will be split into the train/test/validation bins. At the "neural network" configuration 830, the configuration file 612 may specify the architecture of the neural network. For example, the configuration file 612 may specify the number of convolution layers, the size of the kernels, the number of hidden layers, the number of nodes at each hidden layer, and the like. This is useful in regenerating the neural network architecture after the training, and to duplicate any results. At the "driver" configuration 840, the configuration file 612 specifies how many iterations to train the deep learning neural network. At the "reporting" configuration 850, the configuration file 612 specifies which reports and visual plots to generate for future analysis.

In some examples, the staging parameters 810 comprise a SQL query for data extraction and a database path. In some examples, the data ingest parameters 820 comprise training data parameters, a training batch size, and a data ingest size. In some examples, the neural network parameters 830 comprise a neural network architecture parameter, a kernel parameter, a convolution pool parameter, a weight decay, and a number of layers. In some examples, the driver parameters 840 comprise a maximum number of training epochs, a logging frequency for the training epochs, and a driver type. In some examples, the reporting parameters 850 comprise a window size, a mask value, and a step size. The above examples are examples of the parameters of the configuration file 612 and do not limit the parameters that may be included in the configuration file 612. The staging parameters 810 may include synthetic aperture radar (SAR) data. However, the architecture disclosed herein does not limit the type of data that can be processed. The reporting parameters 850 relate to recording results and generating plots for analyses by human(s) or by machine(s).

At operation 720, the server 610 trains, using the training module 613, the machine learning module 614 to solve a problem (e.g. recognizing which of the US presidents is shown in an image). The machine learning module 614 is to operate according to the parameters specified in the configuration file 612. The machine learning module 614 generates an output representing the trained machine learning module 614 (e.g. an indication that the machine learning module 614 is trained) and provides the output to the client device 640.

At operation 730, the server 610 executes the trained machine learning module 614 to solve the problem (e.g. to recognize the face of a US president in an image) and provides an output representing the solution to the problem to the client device 640. For example, the server 610 may provide an indication that President Bill Clinton is shown in the image.

At operation 740, the server 610 records, using the recording module 615, the configuration file 612 and the session result to the logging directory. The logging directory may reside at the server 610 or at the data repository 630 and may be accessible by the client device 640. A user of the client device 640 may use the logging directory to study past machine learning training sessions.

Figure 9:
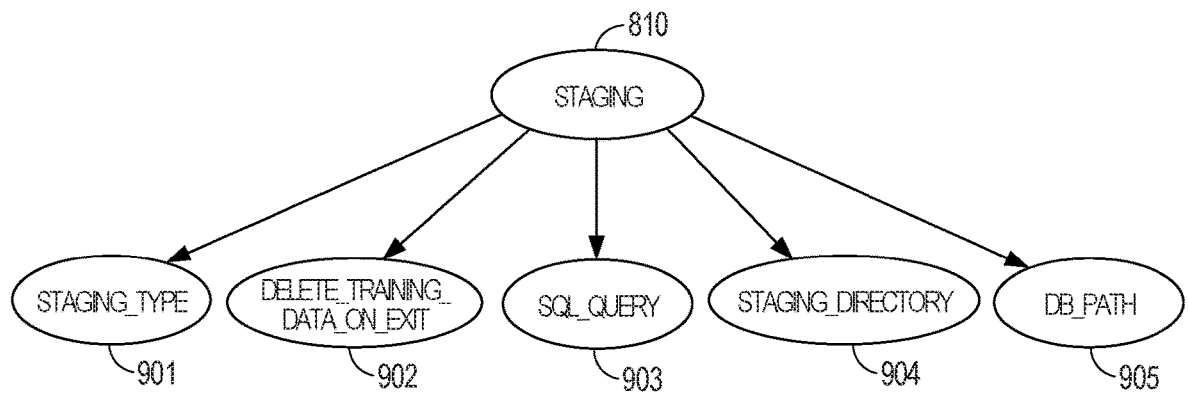
FIG. 9 illustrates examples of staging parameters of the configuration file, in accordance with some embodiments.

FIG. 9 illustrates examples of staging parameters 810 of the configuration file 612, in accordance with some embodiments. As shown, the staging parameters 810 include a staging type 901 (staging function to call), a "delete training data on exit" flag 902 (flag to delete the staged data after training), a SQL query 903 for data extraction (SQL query to acquire the data), a staging directory 904 (where to stage the data for training), and a database path 905 (URL (uniform resource locator) to the database location) for accessing data in the data repository 630.

Figure 10:
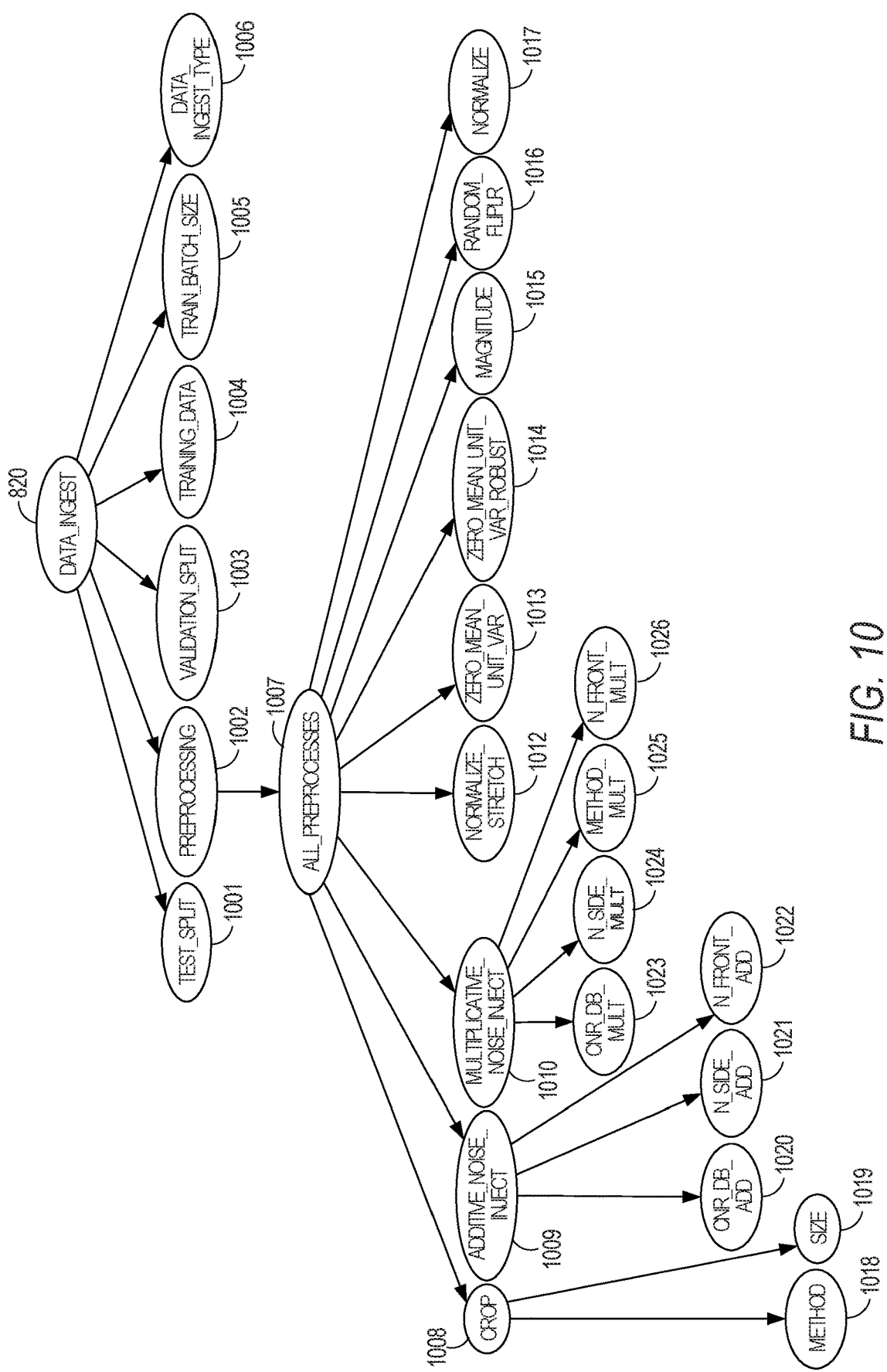
FIG. 10 illustrates examples of data ingest parameters of the configuration file, in accordance with some embodiments.

FIG. 10 illustrates examples of data ingest parameters 820 of the configuration file 612, in accordance with some embodiments. As shown, the data ingest parameters 820 include test split 1001 (what percentage of the data to split off for testing the ML results), a preprocessing branch 1002 (preprocessing to perform during execution of training module 613; only the ones that the user wants to execute is specified in the configuration file 612), validation split 1003 (what percentage of data to split off for validation), training data 1004 (URL (uniform resource locator) of the staged training data), a training batch size 1005 (batch size of the training data at each iteration), and a data ingest type 1006 (type of data (2D image, 3D point cloud, etc.)).

The preprocessing branch 1002 includes all preprocesses 1007 (different preprocessing can be performed on validation/testing/training data sets. "all preprocesses" specifies to apply the same preprocessing to all data sets). All preprocesses 1007 include a crop branch 1008 (cut out a sub-image), an additive noise inject branch 1009, a multiplicative noise inject branch 1010, normalize stretch 1012 (normalize and stretch the intensity of the image), zero mean unit variable 1013 (normalize the image to zero mean and unit variance), zero mean unit variable robust 1014 (more robust method of zero mean unit variance method above), a magnitude 1015 (convert image to magnitude data), a random flip 1016 (randomly flip the image left/right), and normalize 1017 (randomly flip the image left/right).

The crop branch 1008 includes method 1018 (how to cut) and size 1019 (size of the sub-image). The additive noise inject branch 1009 (add noise to the data) includes CNR database add 1020, n side add 1021, and n front add 1022. The multiplicative noise inject branch 1010 (multiply noise to the data) includes CNR database multiply 1023, n side multiply 1024, method multiply 1025, and n front multiply 1026.

Figure 11:
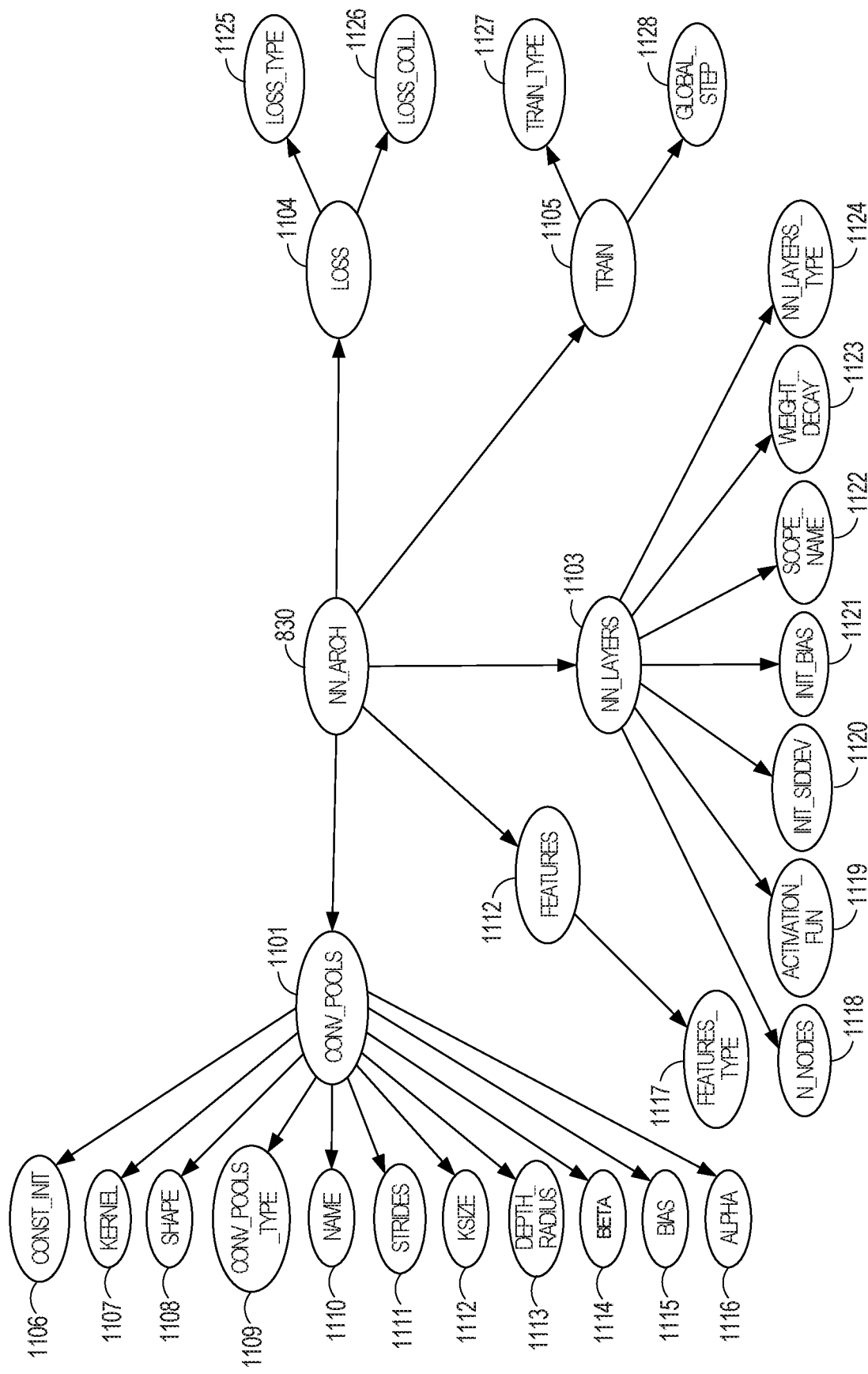
FIG. 11 illustrates examples of neural network parameters of the configuration file, in accordance with some embodiments.

FIG. 11 illustrates examples of neural network parameters 830 of the configuration file 612, in accordance with some embodiments. As shown, the neural network parameters 830 include the following sub-branches: convolution pools 1101, features 1102, neural network layers 1103, loss 1104, and train 1105.

The convolution pools sub-branch 1101 (parameters that specify the convolution and pooling layers) includes: constant initial 1106 (initialize the weights with constant value), kernel 1107 (shape of the convolution weights or kernel), shape 1108 (shape of the convolution weights), convolution pools type 1109 (convolution, pooling or activation function), name 1110 (name of the operation), stride 1111 (how to stride the data in convolution), k size 1112 (maximum pooling window size), depth radius 1113 (how many channels to include during activation), beta 1114 (activation function parameter), bias 1115 (used to initialize the weights), and alpha 1116 (parameter used for activation function). The features sub-branch 1102 (specifies layer between convolution pooling and fully connected layers) includes features type 1117 (how to generate the layer (flatten or pyramid pooling)). The neural network layers sub-branch 1103 (specifies the hidden layers) includes: n nodes 1118 (number of nodes in the hidden layer), activation function 1119 (which activation function to use), initial standard deviation 1120 (how to initialize the variables for the neural network layers), initial bias 1121 (how to initialize the variables for the neural network layers), scope name 1122, weight decay 1123 (parameter used for decaying the learning rate), and neural network layers type 1124 (added for extensibility for different types of neural network layers). The loss sub-branch 1104 (how to calculate the loss value to minimize) includes: loss type 1125 (type of loss function) and loss collection 1126 (parameter used for aggregating the loss). The train sub-branch 1105 (how to apply backpropagation) includes: train type 1127 (Adam optimizer, gradient descent, etc.) and global step 1128 (how much to correct at each iteration).

Figure 12:
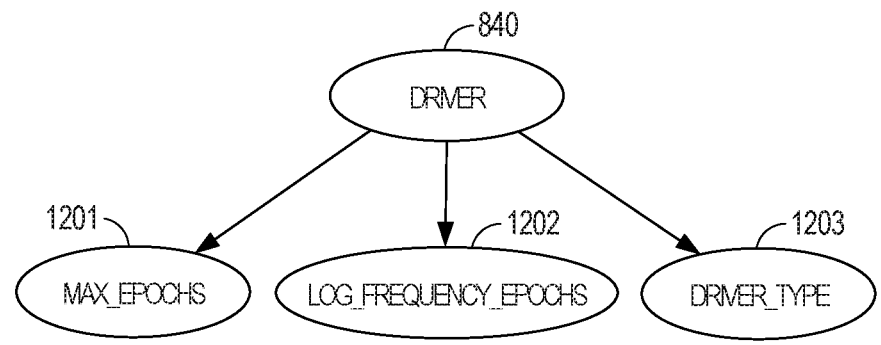
FIG. 12 illustrates examples of driver parameters of the configuration file, in accordance with some embodiments.

FIG. 12 illustrates examples of driver parameters 840 of the configuration file 612, in accordance with some embodiments. As shown, the driver parameters 840 (specify how to train the neural network) include: max epochs 1201 (number of iterations to train), log frequency of epochs 1202 (iterations to log out), and driver type 1203 (which driver function to use e.g. gan_driver or cnn_driver).

Figure 13:
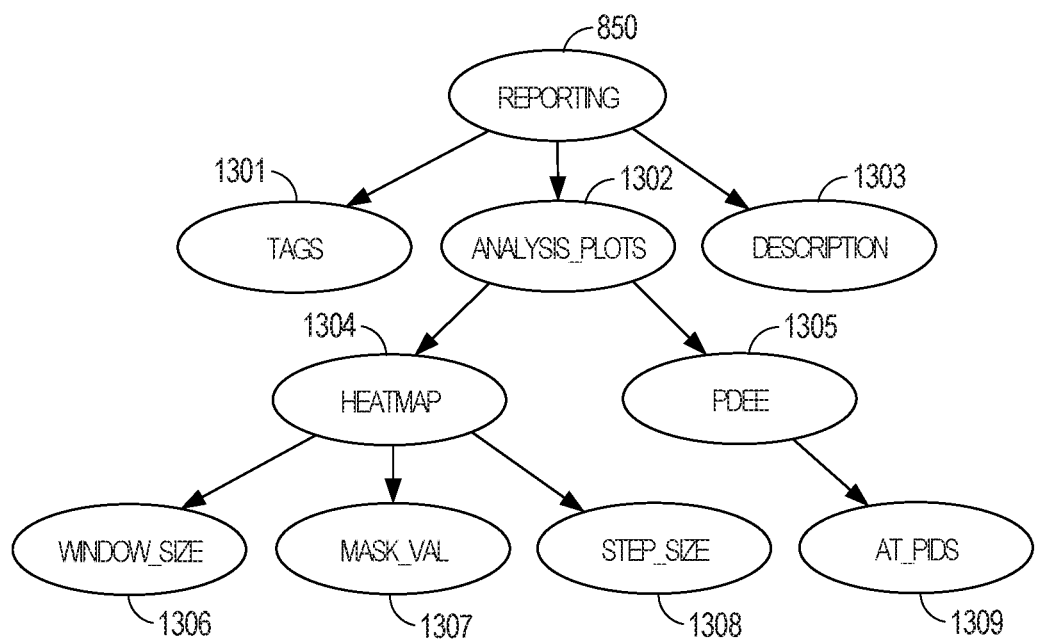
FIG. 13 illustrates examples of reporting parameters of the configuration file, in accordance with some embodiments.

FIG. 13 illustrates examples of reporting parameters 850 of the configuration file 612, in accordance with some embodiments. As shown, the reporting parameters 850 (specifies which analysis plots to generate after training as well as experiment details) include: tags 1301 (experimental tag), an analysis plots sub-branch 1302 (plots to generate), and description 1303 (experiment description). The analysis plots sub-branch 1302 includes a heatmap sub-branch 1304 (occlusion-sensitivity image) and a PDEC sub-branch 1305. The heatmap sub-branch 1304 includes: window size 1306 (size of the occlusion window), mask value 1307 (occlusion window value), and step size 1308 (occlusion window step size). The PDEC sub-branch 1205 (probability of detection matrix) includes AT PIDS 1309 (probability of identifier (ID) parameter).

The technology described herein, in some implementations, automates tuning of a machine learning algorithm and makes the machine learning algorithm easily modifiable. The technology may be queue-able. Queuing is useful as it allows for multiple jobs to be run without user input between jobs. For example, if a user leaves at 5 PM one evening and returns at 9 AM the next morning, he/she can queue two seven-hour jobs to be run in series, without additional user input after the first job is completed (e.g. seven hours after 5 PM). The result of the second job may be provided to the user 14 hours after 5 PM, before he/she returns the next morning. The technology may record the configurations and parameters used in a machine learning algorithm. The technology is reproducible as it allows for reloading of learned results.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A machine learning apparatus, the apparatus comprising:
processing circuitry and memory; the processing circuitry to:
access a configuration file, the configuration file specifying parameters for a machine learning session, the configuration file having a tree structure, the tree structure comprising branches that separate the parameters into categories including one or more of: staging parameters, data ingest parameters, neural network parameters, driver parameters, and reporting parameters;
train a machine learning module to solve a problem, wherein the machine learning module operates according to the parameters specified in the configuration file; and
generate an output representing the trained machine learning module.

2. The apparatus of claim 1, the processing circuitry further to:
execute the trained machine learning module to solve the problem.

3. The apparatus of claim 1, wherein the configuration file is a JSON (JavaScript Object Notation) file.

4. The apparatus of claim 1, wherein the staging parameters comprise a SQL query for data extraction and a database path.

5. The apparatus of claim 1, wherein the data ingest parameters comprise training data parameters, a training batch size, and a data ingest size.

6. The apparatus of claim 1, wherein the neural network parameters comprise a neural network architecture parameter, a kernel parameter, a convolution pool parameter, a weight decay, and a number of layers.

7. The apparatus of claim 1, wherein the driver parameters comprise a maximum number of training epochs, a logging frequency for the training epochs, and a driver type.

8. The apparatus of claim 1, wherein the reporting parameters comprise a window size, a mask value, and a step size.

9. A non-transitory machine-readable medium for machine learning, the machine-readable medium storing instructions which, when executed by processing circuitry of one or more machines, cause the processing circuitry to:
access a configuration file, the configuration file specifying parameters for a machine learning session, the configuration file having a tree structure, the tree structure comprising branches that separate the parameters into categories including one or more of: staging parameters, data ingest parameters, neural network parameters, driver parameters, and reporting parameters;
train a machine learning module to solve a problem, wherein the machine learning module operates according to the parameters specified in the configuration file; and
generate an output representing the trained machine learning module.

10. The non-transistory machine-readable medium of claim 9, the processing circuitry further to:
execute the trained machine learning module to solve the problem.

11. The non-transistory machine-readable medium of claim 9, wherein the configuration file is a JSON (JavaSctipt Object Notation) file.

12. The non-transistory machine-readable medium of claim 9, wherein the staging parameters comprise a SQL query for data extraction and a database path.

13. The non-transistory machine-readable medium of claim 9, wherein the data ingest parameters comprise training data parameters, a training batch size, and a data ingest size.

14. The non-transistory machine-readable medium of claim 9, wherein the neural network parameters comprise a neural network architecture parameter, a kernel parameter, a convolution pool parameter, a weight decay, and a number of layers.

15. The non-transistory machine-readable medium of claim 9, wherein the driver parameters comprise a maximum number of training epochs, a logging frequency for the training epochs, and a driver type.

16. The non-transistory machine-readable medium of claim 9, wherein the reporting parameters comprise a window size, a mask value, and a step size.

17. A machine learning method comprising:
accessing a configuration file, the configuration file specifying parameters for a machine learning session, the configuration file having a tree structure, the tree structure comprising branches that separate the parameters into categories including one or more of: staging parameters, data ingest parameters, neural network parameters, driver parameters, and reporting parameters:
training a machine learning module to solve a problem, wherein the machine learning module operates according to the parameters specified in the configuration file; and
generate an output representing the trained machine learning module.

18. The method of claim 17, wherein the configuration file is a JSON (JavaScript Object Notation) file.

* * * * *